May 3, 1966 H. C. SIMONS ETAL 3,249,184
ELECTRO-MAGNETIC FLUID CLUTCH
Filed June 3, 1963 2 Sheets-Sheet 1

INVENTORS
HOMER C. SIMONS
BY ANDREW S. GILL JR.

ATTORNEYS

May 3, 1966

H. C. SIMONS ETAL 3,249,184

ELECTRO-MAGNETIC FLUID CLUTCH

Filed June 3, 1963

INVENTORS
HOMER C. SIMONS
BY ANDREW S. GILL JR.

Williams, David,
Hoffmann & Yount
ATTORNEYS

United States Patent Office 3,249,184
Patented May 3, 1966

3,249,184
ELECTRO-MAGNETIC FLUID CLUTCH
Homer Charles Simons, South Euclid, and Andrew S. Gill, Jr., Moreland Hills, Ohio, assignors to Eaton Manufacturing Company, Cleveland, Ohio, a corporation of Ohio
Filed June 3, 1963, Ser. No. 285,132
6 Claims. (Cl. 192—21.5)

The present invention relates to a magnetic coupling and, more particularly, to a magnetic coupling of the type employing relatively rotatable members coupled, respectively, to a power source and a load and having located therebetween a magnetic torque transmitting material responsive to the flux of a magnetic field to couple the relatively rotatable members for unitary rotation.

The principal object of the present invention is to provide a new and improved magnetic coupling wherein the flux acting upon the magnetic coupling material is concentrated to provide a more effective coupling action between the particles of the magnetic material which results in an increased torque output. Thus, a coupling having a given output torque may be made smaller in size and is more efficient.

A further object of the present invention is the provision of a new and improved magnetic coupling, as noted in the next preceding paragraph, wherein the concentration of flux is attained by flux controlling grooves formed in one of the rotable members, which grooves define pole tip means on the one rotatable member providing a flux path of relatively low reluctance while the grooves themselves provide a path of relatively high reluctance and thus provide for concentrating substantially all of the flux into a path extending through the pole tip means.

A further object of the present invention is the provision of a new and improved electromagnetic device which includes a first member providing a path for magnetic flux and having a given surface area in the flux path; a second member rotatable relative to said first member and spaced from the first surface to provide a gap therebetween, magnetic material in said gap responsive to a magnetic flux for providing a coupling action between the first and second members, a pair of spaced substantially parallel annular flux controlling grooves in said second member coextensive at least in part with said given surface area and defining a pole tip means on said second member facing the first surface and projecting from said second member towards the given surface area, said grooves providing a magnetic path of high reluctance to concentrate substantially all of the flux transmitted through the gap into a path extending through said pole tip means.

A further object of the present invention is the provision of a new and improved magnetic coupling, as noted in the next preceding paragraph, wherein the area of the pole tip means is approximately 80% of the given surface area.

A further object of the present invention is the provision of a new and improved magnetic coupling, as noted above, wherein the area of the pole tip means which faces the given area is not less than 60% of the given surface area.

Further objects and advantages of the present invention will be apparent to those skilled in the art to which it relates from the following detailed description of the preferred embodiment thereof made with reference to the accompanying drawings forming a part of this specification and in which, FIG. 1 is a partial vertical, axial, sectional view illustrating a magnetic coupling embodying the present invention;

Figure 1:
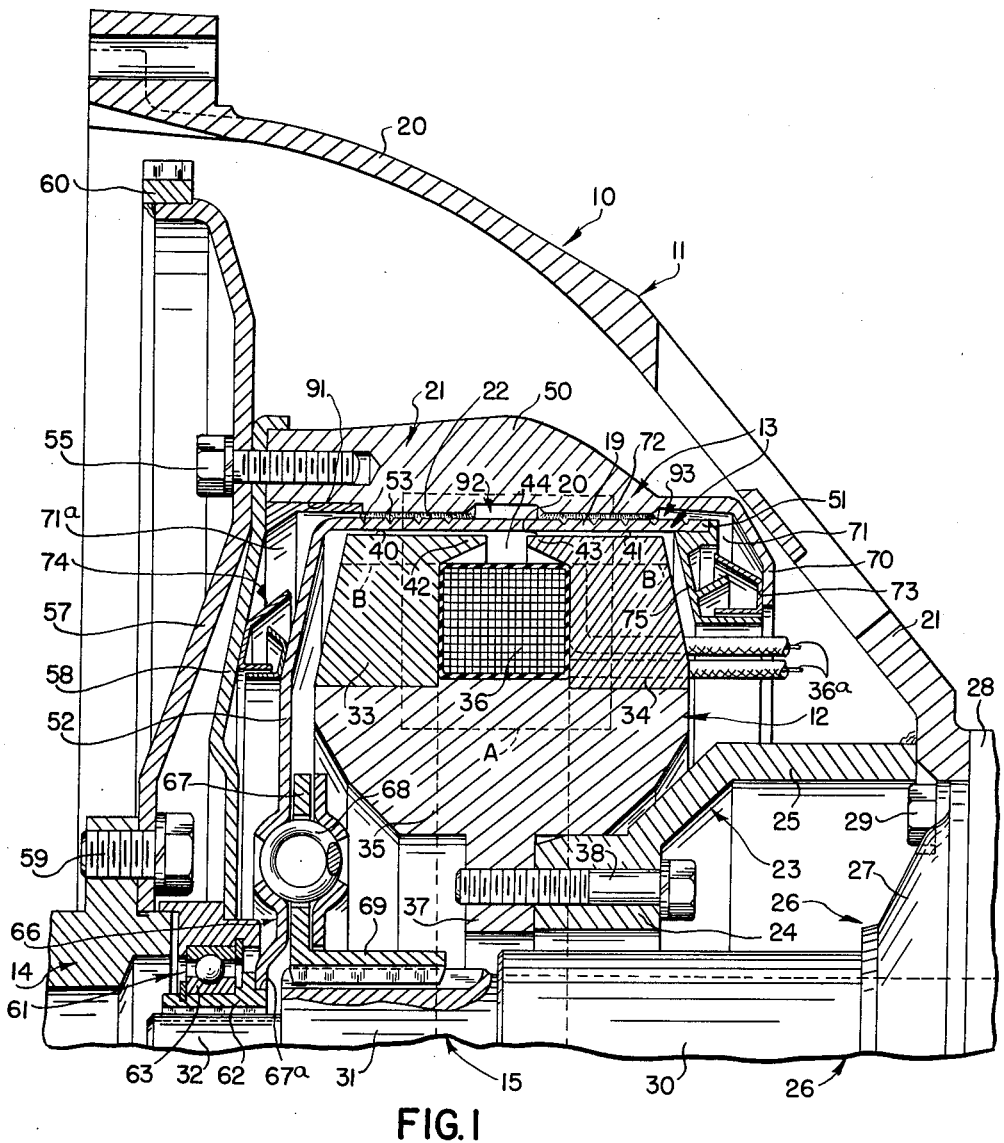
Figure 2:
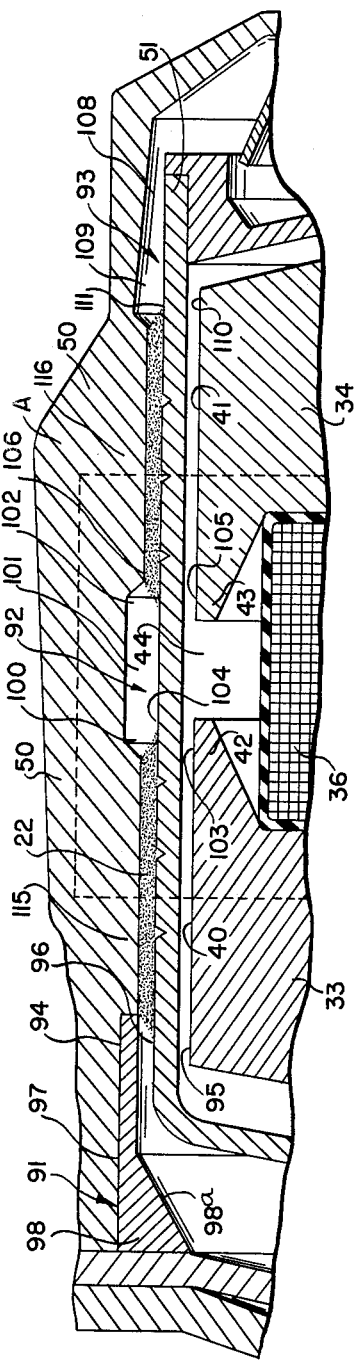
FIG. 2 is an enlarged view of a portion of the magnetic coupling illustrated in FIG. 1.

A preferred embodiment of the novel electromagnetic coupling 10 embodying the present invention is shown in the accompanying drawings as comprising a housing 11 having a magnetic field means 12 therein for producing magnetic flux, and a rotor means 13 operatively associated with the field means 12 for transmitting power between a first shaft member 14 and a second shaft member 15 when the field means 12 is energized. The coupling 10 is here shown as being in the form of a clutch of the magnetic particle type intended for use between a power source and an associated transmission and this is the particular embodiment of the invention which is described in detail hereinafter. It should be understood, however, that the invention can be embodied in various different forms of couplings whose specific uses and structure may be different from that described herein.

The housing 11 of the coupling 10 is a stationary housing having a relatively large end portion 20 adapted for attachment to a portion of the apparatus containing the power source, not shown, and a relatively small end portion 21 extending toward the associated transmission to which power is supplied by the shaft member 15 which, in this case, is the power output shaft. The field means 12 is illustrated as being stationary, and is secured in the housing 11 in a surrounding relation to the output shaft 15. The rotor means 13 comprises a first annular rotor member 19 encircling the field means 12 and spaced therefrom to provide an air gap 20 therebetween, and a second annular rotor member 21 encircling the rotor 19 and spaced radially therefrom to provide a magnetic particle gap 22 therebetween, as will be described in more detail hereinbelow.

The first rotor 19 is a power output rotor and the second rotor 21 is a power input rotor. The first rotor 19 is connected with the rotatable power output shaft 15 in a manner to be presently described and the second rotor 21 is connected with the shaft member 14 in a manner to also be presently described and which shaft member 14, in this case, is the power input shaft.

As above mentioned, the field means 12 is secured in the housing 11, and there is provided in the housing 11 a mounting bracket 23 forming a support for the field means 12. The bracket 23 includes a terminal block portion 24 and a flange portion 25 extending generally axially from the block portion 24 and suitably attached to the housing 11.

The output shaft 15 is rotatably supported by a suitable support bearing 26. The support bearing 26 has an enlarged end portion 27 which is suitably secured to a transmission member 28 by fasteners 29. The portion 27 of the support bearing 26 has an inwardly extending tubular portion 30 through which output shaft 15 extends and which acts as a cover and shield for the ouput shaft. For a purpose which will be described hereinafter, the inner end portion of the output shaft 15 projects from the inner end of tubular portion 30 and comprises a splined portion 31 and an adjacent stem portion 32.

The field means 12 comprises a pair of axially adjacent annular pole members 33, 34 supported by a base member 35 and an electrically energized field coil means 36 pisitioned between the pole members 33, 34. Energizing current is supplied to the coil means 36 from an available source by suitable conductors 36a. The base member 35 of the field means includes a radially projecting flange 37 which extends from the base member 35 adjacent the block portion 24 of the bracket 23. The field means 12 is secured to the bracket 23 by screws 38 which extend through the block portion 24 of the bracket 23 and into the flange portion 37 of the base member 35.

The pole members 33, 34 are circular in shape and the outer cylindrical peripheral surfaces thereof provide two annular pole face areas 40, 41, respectively, which have a predetermined axial length and are presented toward the rotor member 19 and are spaced therefrom by the intervening annular air gap 20. The pole members 33, 34 have pole tips 42, 43, respectively, which partially overhang the field coil means 36 and which are separated by an intervening annular air gap 44 extending around the filed means 12 providing a radial slot in the periphery thereof of relatively high magnetic reluctance.

The input rotor member 21 includes an outer annular drum portion 50 extending around the filed means 12 and spaced radially from the annular pole portions 33, 34. The rotor 19 includes an inner annular drum portion 51 which is carried by a disk portion 52 and lies between the drum portion 50 and the pole portions 33, 34. The inner drum portion 51 is spaced from the drum portion 50 by the aforementioned magnetic particle gap 22. The drum portions 50, 51 extend axially across the pole portions 33, 34 and span the radial gap 44 therebetween. The outer surface of the drum portion 51 is provided with a plurality of circumferential grooves 53 for increasing the space for the magnetic material in the gap 22 so that when the magnetic field is collapsed the magnetic material will not bind between drum portion 51 and pole tips 115 and 116.

The drum portion 50 is carried and piloted by disk means 58. Disk means 58 and output drum portion 50 are connected to disk means 57 by screws 55 and disk means 57 is connected to output means 14 by suitable screws 59. Disk means 58 has an antifriction bearing 61 mounted thereon centrally thereof which provides a piloting support for the rotor member 19 and for the stem portion 32 of output shaft 15. Disk means 57 has an annular gear 60 mounted on the outer periphery thereof.

A sleeve member 62 is mounted on the inner race 63 of the antifriction bearing 61 and the stem portion 32 of the output shaft 15 is received therein and keyed thereto. The sleeve member 62 includes a ledge 67a on wihch a carrier 66 is suitably secured. The carrier 66 includes a radial flange 67 on which the rotor 19 is mounted and a plurality of cushioning springs 68. The carrier 66 is an extension of disk 52 which is part of rotor 19, and flange 67 is a part of central sleeve 69. Carrier 66 and flange 67 contain a plurality of cushioning springs 68. The carrier 66 and flange 67 are connected by suitable rivets providing relative motion between the two members.

The end of the drum portion 50 remote from the disk 58 of the rotor 21 is provided with an annular end member 70 so that this rotor has an internal annular chamber 71 therein lying adjacent to the inner surface of the drum portion 50 and between the disk member 75 and the end member 70. The chamber 71 contains particulate magnetic material 72 of a suitable character to serve as a torque transmitting medium between the rotors 19 and 21 when the field means 12 is energized and the particulate material is subjected to the action of magnetic flux produced by the field means.

The particulate material 72 is located in the magnetic particle gap 22 and is retained in the chambers 71 and a similar chamber 71a at the end of the gap 22 opposite the end where chamber 71 is located by suitable packings 74, 73, respectively, of the labyrinth type. The packing 74 is at one end of the rotor means 13 and is located between the disk means 58 and the adjacent disk portion 52 of the rotor 19. The packing 73 is located at the other end of the rotor means 13 and is located between the end member 70 and an adjacent annular extension portion 75 of the rotor 19.

From the construction of the electromagnetic apparatus 10 as thus far described, it will be recognized that when the field means 12 is energized by current supplied to the coil means 36, the magnetic flux produced by the coil means has a closed path, generally designated A in FIG. 1. The direction in which the flux moves along path A is, of course, dependent upon the direction of current flow through the coil 36. The path A extends through each of the pole portions 33, 34 and base portion 35. The path A also extends through the portion of the air gap 20 between pole face area 40 and drum portion 51, the portion of drum portion 51 facing pole face area 40 and the magnetic particle gap 22. The path A further extends through the portion of the air gap 20 between pole face area 41 and drum portion 51, the portion of drum portion 51 facing pole face area 40 and the magnetic particle gap. Passage of the flux through the magnetic material 72 changes the character thereof by partially solidifying such material and thereby rendering the material capable of transmitting torque from the rotor 21 to the rotor 19.

The driving of the rotor 19 from the rotor 21 under these conditions results in torque being transmitted to the output shaft 15 through the carrier 66 and in such torque being delivered by the output shaft 15 to the associated transmission. When the coil 36 is de-energized the production of the magnetic flux ceases, whereupon the magnetic material 72 resumes its loose or fluid state and the driving connection between the rotor 19 to the rotor 21 is interrupted.

According to the present invention, the magnetic flux passing through the magnetic particle gap 72 is concentrated to increase the number of lines of flux per unit of area. To this end the inner surface of the rotor 50 is provided with a plurality of spaced channels or grooves 91, 92, and 93 located, respectively, forwardly, centrally, and rearwardly of the rotor member 50. The channels or grooves 91, 92, and 93 are distinct in that they are different in size and primary function from other grooves in the rotor members and specifically different from grooves 53 which are primarily for a different purpose. The channels 91 and 92 have an axial distance therebetween less than the axial length of the pole face area 40, and channels 92 and 93 have an axial distance therebetween less than the axial length of the pole face area 41. The channels 91, 92 and 92, 93, respectively, provide areas therebteween which are less than the pole face areas 40, 41, respectively.

The channel 91 is of substantial axial length and has a first portion 94 thereof which overlies and extends coextensive with a portion 95 of the pole face area 40 of the pole member 33 and also with a portion 96 of the surface of the drum 51 through which the flux is transmitted. A second portion 97 of the channel 91 extends above the labyrinth seal 74. A ring member 98 of non-magnetic material of high reluctance such as aluminum is positioned in the groove 91 and has a tapered surface 98a which guides magnetic material from the labyrinth seal 73 into the gap 22 between the rotor members 19, 21 whenever the field means is energized.

The central channel on groove 92 in the drum member 50 includes channel or groove portions 100, 101, and 102. The groove portion 100 extends coextensive with a portion 103 of the pole face area 40 of the pole member 33 and a portion 104 of the surface of drum 51. The portion 102 extends coextensive with a portion 105 of the pole face area 41 and with a portion 106 of the surface of drum 51. The portions 100 and 102 of the channel 92 are connected by the groove portion 101 which overlies and extends coextensive with the air gap 44 formed between the pole tips 42, 43 of the poles 33, 34, respectively.

The rear channel 93 is provided with a first portion 108 overlying the labyrinth seal 73 and a second portion 109 which is coextensive with a portion 110 of the pole face area 41 of the pole member 34, and is also coextensive with a portion 111 of the surface of the drum member 51. The channels 91, 92 and 92, 93 define therebetween pole tips 115, 116, respectively. The pole tips 115, 116 project from the rotor member 50 toward the pole face areas, respectively, and have uninterrupted surface areas which are less than the pole face areas 40, 41, respectively.

Figure 3:
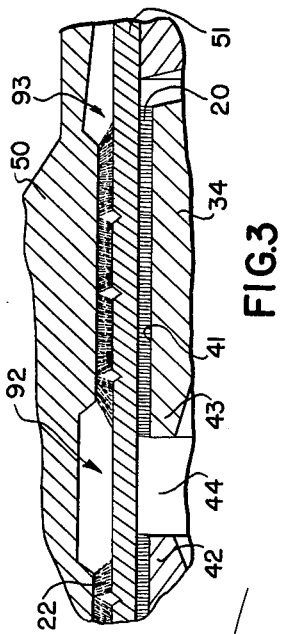
FIG. 3 is another enlarged view of a portion of the magnetic coupling shown in FIG. 1.

The grooves 91, 92, and 93 are sized to extend coextensive with portions of the drum 51 and provide a magnetic path of relatively high reluctance. The pole tips 115, 116 defined by the channels or grooves provide a path of relatively low reluctance and thus the magnetic flux is concentrated into a path extending through the pole tips 115 and 116, respectively. This concentration of the magnetic flux can readily be visualized from FIG. 3, wherein the dotted lines in the air gap 20 and magnetic particle gap 22 illustrate the path of the lines of flux and the concentration thereof in the magnetic particle gap.

By so concentrating the flux flowing through the magnetic particle gap the flux density therein is increased and the magnetic particles are attracted to each other by a greater force of attraction, which force is, of course, directly proportional to the square of the flux density. As a result, the torque which may be transmitted by the coupling is greatly increased.

It has been discovered, however, that if the relative sizes of the coextensively extending area of the pole tips 115, 116, pole face areas 40, 41 and the area presented by the drum 51 become smaller than a given percentage for a given coupling, the torque transmitted by the coupling is greatly reduced. It is believed that this is due to the fact that the cross sectional area of the solidified magnetic material and the areas of physical engagement of the magnetic material with the drums 50, 51 are too small. It is believed that the area of the pole tips should, regardless of the other characteristics of the coupling such as ampere turns, gap widths, etc., always be greater than about 60% of the pole face area 40, 41, and likewise greater than about 60% of the area presented by drum 51.

Figure 4:
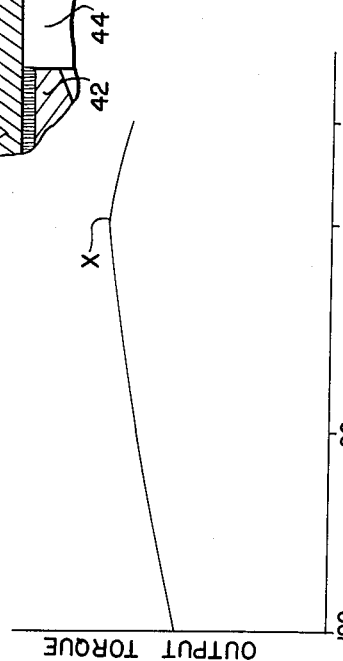
FIG. 4 is a graph illustrating certain operating characteristics of a magnetic coupling embodying the present invention.

Referring now to FIG. 4 of the drawings, the operating characteristics of a magnetic particle clutch embodying the present invention will be apparent. The graph is illustrative of the characteristics of a coupling of the type disclosed. It should be apparent from the graph how output torque varies as the area presented by the pole tips is progressively lessened from a point wherein the pole tips have an area 100% that of the pole face area to a point where the pole tips have an area of 75% of the pole face area. It should be noted that as the area presented by the pole tips is lessened the torque, due to the concentration of the flux, as described above, continually increases to a torque yield point X. A further decrease in the area of the pole tips causes a decrease in the output torque from the yield point.

The graph shown in FIG. 4 is specifically illustrative of a magnetic particle clutch having 2100 ampere turns and a flux density of 100,000 lines per square inch in the iron area, that is, the effective cylindrical area of the pole members 33, 34 as indicated by the line B which lies on the cylindrically shaped iron area. The pole face area is equal to approximately 156% of the iron area or inversely, the iron area is approximately equal to 64 percent of the pole face area and the area presented by the pole tips is equal to 125% of the iron area and 80% of the pole face area and 80% of the area of the drum 51 facing the pole tips. The approximate flux densities in the air gap 20 and magnetic particle gap 22 are approximately 64,000 lines per square inch and 80,000 lines per square inch, respectively. The yield point torque of this specific magnetic particle clutch at 1000 revolutions per minute input is approximately 340 lb. ft., an increase of approximately 30% over the same clutch without flux controlling grooves.

A graph different from that shown in FIG. 4 would be characteristic of the operation of a magnetic particle clutch having a different construction, for example, having a different number of ampere turns or a different width of an air gap or magnetic particle gap. However, it is to be emphasized that every magnetic particle clutch has a yield point at which maximum torque is achieved, which point can be attained by grooving the inner surface of the outer rotor member 50, as above described. For practical purposes, regardless of the dimensions of the magnetic particle clutch, the pole tip area should not be made less than about 60% of the pole face area or, stated differently, 60% of the area of the drum 51 facing the pole tips.

Those skilled in the art should understand from the above description that the areas mentioned, such as the iron area, the pole area, the pole tip area, and the area presented by drum 51 are all cylindrically shaped areas extending at least in part coextensively and which are concentric, and that the size of these areas depends upon the diameter of the cylindrically shaped area and the axial length thereof, and that by varying either of these dimensions the respective area size is changed.

It should be apparent from the above description that the present invention provides a highly improved magnetic coupling through the use of the principle of flux concentration. It should further be apparent that while the above description has been made with reference to a specific embodiment of the present invention, certain changes and modifications may be made therein without departing from the spirit and scope of the present invention, and it is hereby intended to cover all changes and modifications in the present apparatus falling within the appended claims.

Having described our invention, we claim:

1. An electromagnetic device having a path for magnetic flux and comprising, field means including a field coil and means providing a path for magnetic flux produced by the field coil including pole members each of which includes a pole tip separated from the pole tip of the other pole member by an annular air gap and a pole face area located on opposite sides of said air gap in the flux path, an adjacent first rotor member spaced from said pole face areas and encircling said pole face areas, a second rotor member spaced from said first rotor and encircling said first rotor member, providing a gap therebetween, magnetic material in said gap responsive to magnetic flux for drivingly connecting said rotor members, a central annular flux controlling groove formed in one of said rotor members and extending coextensive with said central air gap and coextensive with a portion of said pole face areas on the opposite axial sides of said air gap, a forward flux controlling groove in said one of said rotor members and having a portion thereof extending coextensive with one of said pole face areas, a rearward flux controlling groove in said one of said rotor members having a portion thereof extending coextensive with the other of said pole face areas, said grooves defining pole tip means therebetween having an area extending coextensive with each of said pole face areas and projecting from said one rotor member toward the other rotor member, and smaller in area than the area of said pole faces and said grooves providing a magnetic path of high reluctance to concentrate substantially all the flux into a path portion extending through said pole tip means.

2. An electromagnetic device as defined in claim 1 wherein said forward groove has a nonmagnetic ring member positioned therein having a surface for guiding the magnetic material into said magnetic particle gap.

3. An electromagnetic device as defined in claim 1 wherein said pole tip means has an area equal to approximately 80% of said pole face area.

4. An electromagnetic device as defined in claim 1 wherein said pole tip means has an area not less than approximately 60% of said pole face area.

5. An electromagnetic device having a closed path for magnetic flux and comprising a first annular rotor member having first and second surface areas in the flux path and through which substantially all of the flux extends, a second annular rotor member concentric with said first rotor member and spaced from said surface area to provide a gap therebetween, magnetic material in said gap responsive to magnetic flux to provide a coupling action between said first and second rotor members, means for concentrating the flux in said magnetic particle gap to provide a torque output approximately equal to the torque yield point of the device comprising only three spaced substantially parallel flux controlling annular channels in said second rotor member and defining a pair of annular pole tips projecting from said second rotor member toward said first and second surface areas, respectively, and having third and fourth surface areas facing said first and second surface areas, respectively, and having a smaller axial extent than the axial extent of said first and second surface areas respectively and being less in area than said first and second surface areas, respectively, said channels providing a magnetic path portion of high reluctance so as to concentrate substantially all the flux transmitted through said gap into a path extending through said pole tip means.

6. An electromagnetic device having a closed path for magnetic flux and comprising a pair of pole members each having a cylindrical surface area in said flux path and through which substantially all of the flux extends, said surface areas being axially separated by an annular gap of relatively high magnetic reluctance, means associated with said pole members for producing said magnetic flux, a rotor member spaced from said areas, a magnetic particle gap between said pole members and said rotor member having a magnetic coupling material therein, channel means in said rotor member providing another pair of axially extending surface areas facing said pair of surface areas on said pole members and each of less axial length than each of said surface areas on said pole members and of less area than said surface areas on said pole members, respectively, said channel means defining distanct pole tip means projecting from said rotor member toward said pair of surface areas on said pole members and providing a magnetic path of high reluctance so as to concentrate substantially all of the flux from said pair of surface areas on said pole members into a path extending through said another pair of surface areas on said rotor member and including an annular flux controlling channel radially aligned with said annular gap and a portion of said pair of surface areas on said pole members.

References Cited by the Examiner

UNITED STATES PATENTS

| | | | |
|---|---|---|---|
| 2,543,394 | 2/1951 | Winther | 192—21.5 |
| 2,604,964 | 7/1952 | Winther et al. | 192—21.5 |
| 2,870,888 | 1/1959 | Gill | 192—21.5 |
| 2,885,045 | 5/1959 | Barrett | 192—21.5 |
| 2,990,042 | 6/1961 | Jaeschke | 192—21.5 |

DAVID J. WILLIAMOWSKY, *Primary Examiner.*

DON A. WAITE, *Examiner.*

B. W. WYCHE, III, *Assistant Examiner.*